(12) United States Patent
Sato et al.

(10) Patent No.: US 10,634,193 B2
(45) Date of Patent: Apr. 28, 2020

(54) ROTARY SEAL

(71) Applicant: NAKANISHI METAL WORKS CO., LTD., Osaka-shi (JP)

(72) Inventors: Takahiko Sato, Osaka (JP); Shinichi Akashi, Osaka (JP); Yusuke Iizawa, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 16/033,696

(22) Filed: Jul. 12, 2018

(65) Prior Publication Data

US 2019/0024717 A1 Jan. 24, 2019

(30) Foreign Application Priority Data

Jul. 18, 2017 (JP) ................................. 2017-138743

(51) Int. Cl.
| | |
|---|---|
| *F16J 15/447* | (2006.01) |
| *F16C 33/80* | (2006.01) |
| *F16C 33/78* | (2006.01) |
| *F16J 15/3264* | (2016.01) |

(52) U.S. Cl.
CPC ...... *F16C 33/7823* (2013.01); *F16C 33/7883* (2013.01); *F16J 15/3264* (2013.01)

(58) Field of Classification Search
CPC .. F16J 15/3264; F16J 15/3232; F16J 15/3236; F16J 15/3248; F16J 15/3252; F16C 33/7823; F16C 33/7883
See application file for complete search history.

(56) References Cited

U.S. PATENT DOCUMENTS

2018/0186181 A1* 7/2018 Tada ..................... F16J 15/447

FOREIGN PATENT DOCUMENTS

| | | | | |
|---|---|---|---|---|
| JP | S62-283261 A | | 12/1987 | |
| JP | 2001-065704 A | | 3/2001 | |
| JP | 2004068844 A | * | 3/2004 | .......... F16C 33/7823 |
| JP | 2007285374 A | * | 11/2007 | .......... F16C 33/7883 |
| JP | 2008-202737 A | | 9/2008 | |
| JP | 2010060127 A | * | 3/2010 | .......... F16C 33/7883 |
| JP | 2016186319 A | * | 10/2016 | .......... F16C 33/7883 |
| JP | 2017057930 A | * | 3/2017 | .............. F16C 33/80 |
| WO | WO-2017038751 A1 | * | 3/2017 | .......... F16J 15/3232 |
| WO | WO-2017061242 A1 | * | 4/2017 | .......... F16C 33/7879 |

* cited by examiner

*Primary Examiner* — Gilbert Y Lee
(74) *Attorney, Agent, or Firm* — Kratz, Quintos & Hanson, LLP

(57) ABSTRACT

A rotary seal is used for a horizontal rotation axis or an inclined rotation axis, and has a slinger including a cylindrical portion and an outward flange portion, a core metal including a cylindrical portion and an inward flange portion, and a seal member including a base joined to the core metal and an axial lip brought into sliding contact with an axially inner surface of the outward flange portion. The rotary seal includes a lip wetting inhibitor located radially outward of the axial lip, in which a gap is provided between a tip end of the lip wetting inhibitor and the axially inner surface of the outward flange portion, and the tip end of the lip wetting inhibitor does not contact the axially inner surface even if the lip wetting inhibitor is applied with a water pressure and elastically deformed.

5 Claims, 10 Drawing Sheets

// ROTARY SEAL

BACKGROUND OF THE INVENTION

(1) Field of the Invention

The present invention relates to a rotary seal for use in a horizontal rotation axis or an inclined rotation axis in a transport machine or a general machine.

(2) Description of Related Art

For example, as a rotary seal for use in a horizontal rotation axis or inclined rotation axis of a bearing device for supporting an automotive wheel, there is a rotary seal including a slinger, a core metal, and a seal member, which are composed as follows. The slinger is composed of a cylindrical portion and an outward flange portion extending radially outward from an axial end of the cylindrical portion. The core metal is composed of a cylindrical portion and an inward flange portion extending radially inward from an axial end of the cylindrical portion. The seal member is composed of a base joined to the core metal and a seal lip including an axial lip in sliding contact with an axially inner surface of the outward flange portion, the seal member extending from the base (see, for example, Japanese Unexamined Patent Application Publication Nos. 62-283261, 2001-065704 and 2008-202737).

Such a rotary seal as described above is used in a state where the cylindrical portion of the slinger is attached to a radially inner member (for example, an inner ring of a bearing) and the cylindrical portion of the core metal is attached to a radially outer member (for example, an outer ring of the bearing).

In the rotary seal (a combination seal A in FIG. 1) of Japanese Unexamined Patent Application Publication No. 62-283261, a labyrinth gap (B) is formed of a gap between a tip end of the outward flange of the slinger and a tip end of the cylindrical portion of the core metal. In addition, the tip end of the outward flange portion and the tip end of the cylindrical portion are formed into inclined planes (C). With such a configuration, penetration of muddy water or the like into an atmosphere-side annular cavity portion in the rotary seal can be minimized by the labyrinth gap, and the muddy water or the like that has penetrated the atmosphere-side annular cavity portion can be smoothly discharged from the inclined planes to the outside.

In the rotary seal (FIG. 1) of Japanese Unexamined Patent Application Publication No. 2001-065704, a labyrinth seal (4) is formed of a gap between a tip end of the outward flange portion of the slinger and the seal member that covers the tip end of the cylindrical portion of the core metal. In addition, an outer side surface (B) of the outward flange portion is retreated by a predetermined retreat amount (L) inward from an end surface (A) of the seal member that covers the tip end of the cylindrical portion. With such a configuration, sealing performance can be enhanced without complicating the configuration.

In the rotary seal (FIG. 2) of Japanese Unexamined Patent Application Publication No. 2008-202737, in a configuration in which a radial lip (reference numeral 68 in FIG. 6) is omitted in order to reduce sliding heat generation, a second side lip (20) that is an axial lip is provided at a radially outward position of a first side lip (19) that is an axial lip in sliding contact with an axial end surface (33a) of a flange portion (33) of a slinger (31). In addition, a labyrinth seal (41) is formed of a gap between a tip end of the second side lip (20) and the axial end surface (33a). With such a configuration, an increase of torque due to addition of the second side lip can be eliminated while protecting the first side lip from foreign matters such as muddy water or the like by the second side lip.

SUMMARY OF THE INVENTION

In the rotary seal of Japanese Unexamined Patent Application Publication No. 62-283261, the gap between the tip end of the outward flange portion of the slinger and the tip end of the cylindrical portion of the core metal functions as the labyrinth seal. In the rotary seal of Japanese Unexamined Patent Application Publication No. 2001-065704, the gap between the tip end of the outward flange portion of the slinger and the seal member that covers the tip end of the cylindrical portion of the core metal functions as the labyrinth seal. Hence, the muddy water or the like is difficult to penetrate the atmosphere-side annular cavity portion in the rotary seal from the gap.

However, in each of the rotary seals in Japanese Unexamined Patent Application Publication Nos. 62-283261 and 2001-065704, the atmosphere-side annular cavity portion in the rotary seal defines the axial lip (side lip) as a boundary. Accordingly, it is highly possible that the axial lip may be wet when the muddy water or the like penetrates the atmosphere-side annular cavity portion.

Moreover, in the case where the muddy water or the like that is a mixture of a solid and a liquid has high viscosity when the muddy water or the like penetrates the atmosphere-side annular cavity portion, it becomes more difficult to discharge the muddy water or the like to the outside since the gap is small. In the case where the muddy water or the like in the atmosphere-side annular cavity portion is dried and has turned to mud that is a solid, the mud may penetrate a sliding contact portion between an axially inner surface of the outward flange portion and the axial lip, resulting in deterioration of followability of the lip and decrease of the sealing performance.

In the rotary seal (FIG. 2) of Japanese Unexamined Patent Application Publication No. 2008-202737, the atmosphere-side annular cavity portion in the rotary seal does not define the first side lip that is the axial lip as a boundary, but defines the second side lip that is an axial lip provided at the radially outward position of the first side lip as a boundary.

In such a configuration, in the case where the muddy water or the like penetrates the atmosphere-side annular cavity portion in the rotary seal and a water pressure is applied to the second side lip, the gap between the tip end of the second side lip and the axial end surface of the flange portion of the slinger is narrow since the labyrinth seal is formed of the gap, and therefore, the second side lip may be deformed to be brought into contact with the flange portion of the slinger, resulting in an increase of torque.

In addition, in the case where the viscosity of the muddy water or the like is high when the muddy water or the like has penetrated a space between the first side lip and the second side lip, it becomes more difficult to discharge the muddy water or the like since the gap that forms the labyrinth seal is small. In the case where the muddy water or the like that is a mixture of a solid and a liquid in the space is dried and has turned to mud that is a solid, the mud may penetrate a sliding contact portion between an axially inner surface of the outward flange portion and the first side lip, resulting in deterioration of the followability of the lip and decrease of the sealing performance.

The present invention is made in view of the above circumstances, and it is an object of the present invention to provide a rotary seal capable of reducing wetting possibility of an axial lip when muddy water or the like has penetrated an atmosphere-side annular cavity portion in the rotary seal and capable of preventing a decrease of the sealing performance and an increase of the torque.

In order to solve the problems described above, a rotary seal according to the present invention is a rotary seal that includes:

a slinger including a cylindrical portion and an outward flange portion extending radially outward from an axial end of the cylindrical portion;

a core metal including a cylindrical portion and an inward flange portion extending radially inward from an axial end of the cylindrical portion; and a seal member including a base joined to the core metal and a seal lip including an axial lip that extends from the base and is brought into sliding contact with an axially inner surface of the outward flange portion, the rotary seal being used for a horizontal rotation axis or an inclined rotation axis in a state where the cylindrical portion of the slinger is attached to a radially inner member and the cylindrical portion of the core metal is attached to a radially outer member, the rotary seal including a lip wetting inhibitor that is located radially outward of the axial lip and protrudes axially from the base or the inward flange portion toward the outward flange portion, wherein a gap is provided between a tip end of the lip wetting inhibitor and the axially inner surface of the outward flange portion, and the tip end does not contact the axially inner surface even when the lip wetting inhibitor is applied with a water pressure and elastically deformed (claim 1).

With such a configuration, in the case where muddy water or the like has penetrated the atmosphere-side annular cavity portion from the gap located radially outward of the outward flange portion of the slinger, direct contact between the muddy water or the like and the axial lip can be prevented since the lip wetting inhibitor is located radially outward of the axial lip. Accordingly, wetting possibility of the axial lip can be reduced.

In addition, even if the lip wetting inhibitor is applied with a water pressure and elastically deformed, the tip end of the lip wetting inhibitor does not contact the axially inner surface of the outward flange portion of the slinger. Accordingly, the torque is not increased.

Here, a preferable embodiment is that an angle formed by an axial direction and a straight line that extends along a plane including the axial direction is 40° or more and less than 90°, the straight line connecting a tip end of a radially outer circumferential surface of the lip wetting inhibitor and an outer circumferential edge of the axially inner surface of the outward flange portion to each other (claim 2).

With such a configuration, since the angle described above is 40° or more, the muddy water or the like, which has penetrated the atmosphere-side annular cavity portion from the gap located radially outward of the outward flange portion, becomes difficult to penetrate the gap between the tip end of the lip wetting inhibitor and the axially inner surface of the outward flange portion in the case of receiving the muddy water or the like by the lip wetting inhibitor. Accordingly, such an effect of reducing the wetting possibility of the axial lip is increased.

Note that the angle described above is less than 90° in terms of structure.

Furthermore, a more preferable embodiment is that the radially outer circumferential surface of the lip wetting inhibitor is a partially conical surface expanding in diameter as approaching the outward flange portion (claim 3).

With such a configuration, since the radially outer circumferential surface of the lip wetting inhibitor is a partially conical surface expanding in diameter as approaching the outward flange portion, the radially outer circumferential surface of the lip wetting inhibitor is an inclined surface reduced in diameter in a direction of moving away from the outward flange portion of the slinger.

Here, since the radially outer circumferential surface of the lip wetting inhibitor is the inclined surface as described above, the muddy water or the like, which penetrates the atmosphere-side annular cavity portion from the gap located radially outward of the outward flange portion and is received by the lip wetting inhibitor, is difficult to penetrate the gap between the tip end of the lip wetting inhibitor and the axially inner surface of the outward flange portion. Accordingly, the effect of reducing the wetting possibility of the axial lip is further increased.

Still further, a preferable embodiment is that a brim portion that protrudes radially outward is provided on a tip end portion of the radially outer circumferential surface of the lip wetting inhibitor (claim 4).

With such a configuration, the muddy water or the like, which penetrates the atmosphere-side annular cavity portion from the gap located radially outward of the outward flange portion and is received by the lip wetting inhibitor, is difficult to penetrate the gap between the tip end of the lip wetting inhibitor and the axially inner surface of the outward flange portion beyond the brim portion that is provided on the tip end portion of the radially outer circumferential surface of the lip wetting inhibitor and protrudes radially outward. Accordingly, the effect of reducing the wetting possibility of the axial lip is further increased.

Moreover, a still more preferable embodiment is that a radially inner circumferential surface of the lip wetting inhibitor has a shape extending from a position apart from a base end portion of the axial lip toward the outward flange portion, and the lip wetting inhibitor has a substantially cylindrical shape or a substantially truncated conical cylindrical shape (claim 5).

With such a configuration, the radially inner circumferential surface of the lip wetting inhibitor has a shape extending from the position apart from the base end portion of the axial lip toward the outward flange portion. Accordingly, a space between the axial lip and the lip wetting inhibitor located radially outward of the axial lip is increased. In this way, the muddy water or the like, which has penetrated the space from the gap between the tip end of the lip wetting inhibitor and the axially inner surface of the outward flange portion, is difficult to reach the tip end of the axial lip in the case where the muddy water or the like has penetrated the space.

Hence, even if the muddy water or the like in the space described above is dried and is turned to mud that is a solid, such a possibility that the mud may penetrate the sliding contact portion between the axially inner surface of the outward flange portion and the axial lip to result in the deterioration of the followability of the lip is reduced. Accordingly, such an apprehension that the sealing performance may decrease is reduced.

In addition, since the lip wetting inhibitor has a substantially cylindrical shape or a substantially truncated conical cylindrical shape, the volume of the lip wetting inhibitor is reduced. Accordingly, the manufacturing cost of the rotary seal can be reduced, and the weight of the rotary seal can be reduced.

As described above, the rotary seal according to the present invention mainly produces the following advantageous effects.

(1) In the case where muddy water or the like has penetrated the atmosphere-side annular cavity portion from the gap located radially outward of the outward flange portion of the slinger, direct contact between the muddy water or the like and the axial lip can be prevented since the lip wetting inhibitor is located radially outward of the axial lip. Accordingly, wetting possibility of the axial lip can be reduced.

(2) Even if the lip wetting inhibitor is applied with a water pressure and elastically deformed, the tip end of the lip wetting inhibitor does not contact the axially inner surface of the outward flange portion of the slinger. Accordingly, the torque is not increased.

DETAILED DESCRIPTION OF PREFERRED EMBODIMENTS

Next, embodiments of the present invention will be described in detail with reference to the accompanying drawings; however, the present invention is not limited to the embodiments shown in the accompanying drawings and includes all embodiments satisfying requirements described in the claims.

Note that, in the present specification, in a state in which a rotary seal is attached to a radially inward member and a radially outward member, a direction of a rotation axis of a radially inner member that is a member on a rotation side will be referred to as an "axial direction", and a direction orthogonal to the axial direction will be referred to as a "radial direction".

In the following embodiments, a description will be given of the case where the axial direction is a horizontal direction; however, the axial direction may be a direction inclined from the horizontal direction. That is, a horizontal rotation axis A in FIGS. 1, 3, 5, 7 and 9 may be an inclined rotation axis.

Moreover, in the radially inward member and the radially outward member, onto which the rotary seal of the present invention is attached, such a case that axial centers of these members are shifted from each other (that is, a case where these members are misaligned with each other) is also included.

First Embodiment

Figure 1:
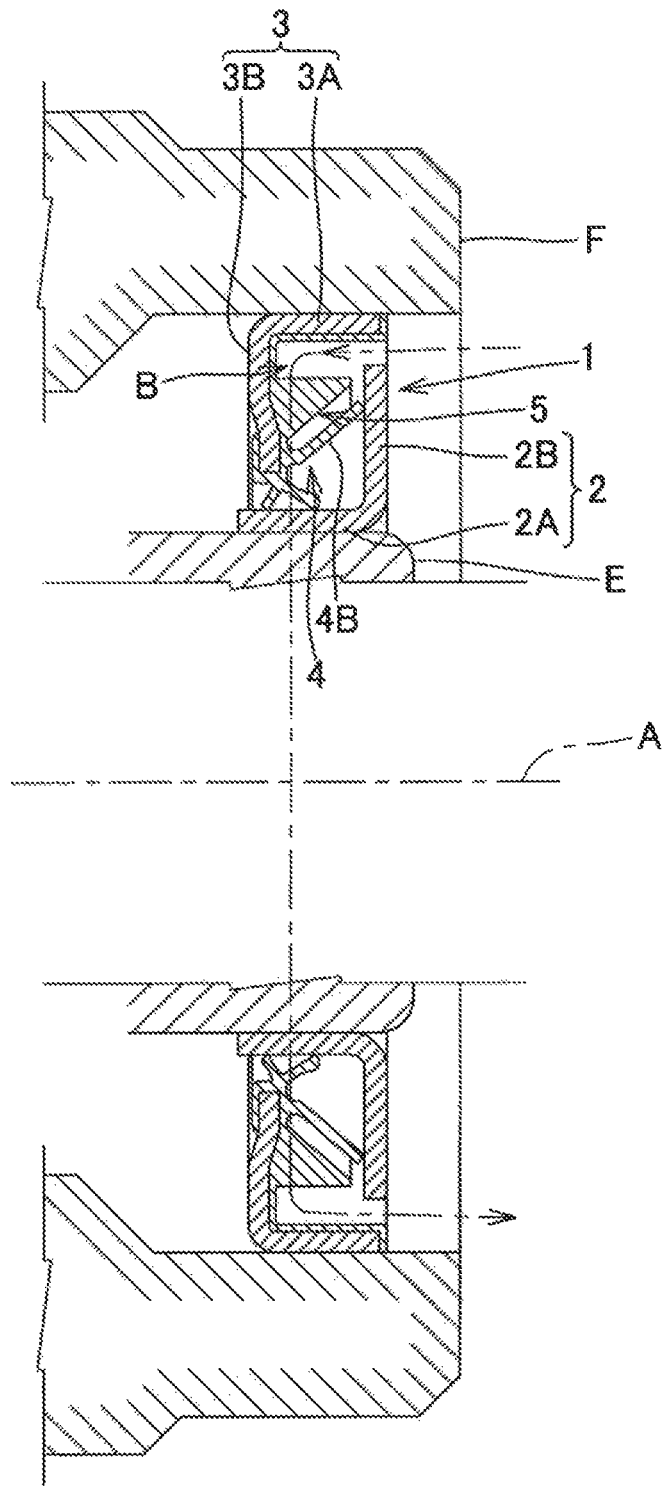
FIG. 1 is an enlarged longitudinal cross-sectional view of a principal portion, showing a state in which a rotary seal according to a first embodiment of the present invention is attached to a radially inward member and a radially outward member.
Figure 2:
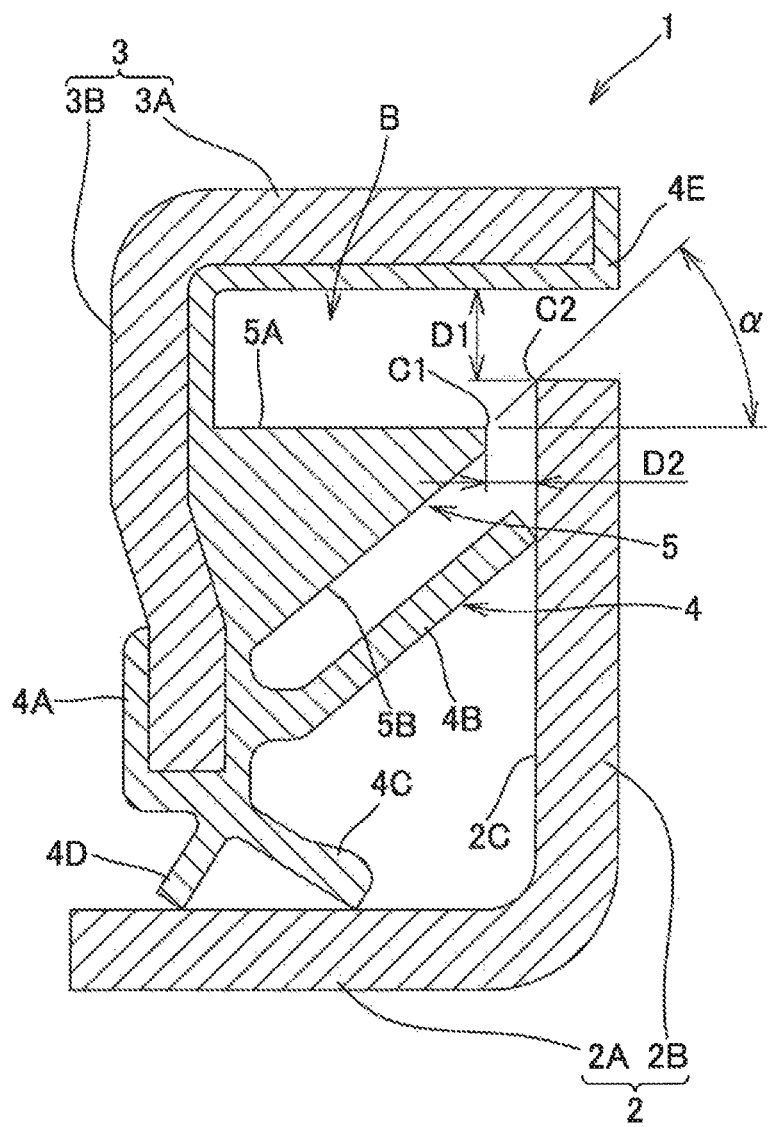
FIG. 2 is an end view of a cut portion taken along a plane including an axial direction of the rotary seal.

As shown in an enlarged longitudinal cross-sectional view of a principal portion in FIG. 1 and an end view of a cut portion in FIG. 2, a rotary seal 1 according to a first embodiment of the present invention includes a slinger 2, a core metal 3, a seal member 4, and a lip wetting inhibitor 5. The rotary seal 1 is used in a state in which the slinger 2 is attached to a radially inner member E and the core metal 3 is attached to a radially outer member F.

The slinger 2 is composed of a cylindrical portion 2A and an outward flange portion 2B extending radially outward from an axial end of the cylindrical portion 2A.

The core metal 3 is composed of a cylindrical portion 3A and an inward flange portion 3B extending radially inward from an axial end of the cylindrical portion 3A.

The slinger 2 and the core metal 3 are made of, for example, a stainless steel plate by presswork.

The cylindrical portion 2A of the slinger 2 is attached to the radially inner member E, and the cylindrical portion 3A of the core metal 3 is attached to the radially outer member F.

To the core metal 3, a base 4A of the seal member 4 that is an elastic body such as rubber is adhered by vulcanization.

The seal member 4 has a lip structure including an axial lip 4B that extends from the base 4A and is brought into sliding contact with an axially inner surface 2C of the outward flange portion 2B and including a radial lip 4C and a grease lip 4D that are brought into sliding contact with an outer circumferential surface of the cylindrical portion 2A. Moreover, the seal member 4 has an outer circumferential seal portion 4E that covers a tip end of the cylindrical portion 3A, and the outer circumferential seal portion 4E connects to the base 4A from an inner circumferential surface side of the cylindrical portion 3A.

The lip wetting inhibitor 5 is integral, for example, with the seal member 4, and is located radially outward of the axial lip 4B. Moreover, the lip wetting inhibitor 5 protrudes axially from the base 4A toward the outward flange portion 2B, and inhibits wetting of the axial lip 4B.

Note that the lip wetting inhibitor 5 may be a separate body from the seal member 4, and the lip wetting inhibitor 5 being thus separated from the seal member 4 may be joined to the base 4A or the inward flange portion 3B The lip wetting inhibitor 5 being thus separated from the seal member 4 may be made of an elastic body such as rubber, or may be made of a synthetic resin or metal.

A gap D1 shown in FIG. 2 is defined between a tip end of the outward flange portion 2B and the outer circumferential seal portion 4E. The gap D1 has a length of 6 to 20% of a radial length of a whole including the slinger 2 and the core metal 3 in the end view of the cut portion in FIG. 2.

A lower limit value of the gap D1 is set to a value at which the outer circumferential seal portion 4E does not contact the tip end of the outward flange portion 2B of the slinger 2 due to inclined rotation and misalignment depending on mounting and product dimension accuracy.

Note that, in the case where a wraparound portion of a magnetic encoder is provided in a configuration of joining the magnetic encoder to the outward flange portion 2B of the slinger 2, the lower limit value of the gap D1 is set to a value at which the outer circumferential seal portion 4E does not contact a tip end of the wraparound portion of the magnetic encoder due to the inclined rotation and the misalignment depending on the mounting and product dimension accuracy.

An upper limit value of the gap D1 is set in consideration of drainage and a positional relationship between the axial lip 4B and the lip wetting inhibitor 5.

As shown by arrow in FIG. 1, muddy water or the like that penetrates an atmosphere-side annular cavity portion B from the gap D1 located radially outward of the outward flange portion 2B is discharged from the gap D1 by gravity.

In the case where the muddy water or the like has penetrated the atmosphere-side annular cavity portion B from the gap D1, direct contact between the muddy water or the like and the axial lip 4B can be prevented since the lip wetting inhibitor 5 is located radially outward of the axial lip 4B. Accordingly, wetting possibility of the axial lip 4B can be reduced.

A gap D2 shown in FIG. 2 is defined between a tip end of the lip wetting inhibitor 5 and the axially inner surface 2C of the outward flange portion 2B. The gap D2 has a length of 7 to 30% of the axial length of the whole including the slinger 2 and the core metal 3 in the end view of the cut portion in FIG. 2.

A lower limit value of the gap D2 is set to a value at which the tip end (for example, a tip end C1 of a radially outer circumferential surface 5A) of the lip wetting inhibitor 5 does not contact the axially inner surface 2C of the slinger 2 or the wraparound portion of the magnetic encoder, depending on the inclined rotation and finished quality of each of the slinger 2, the lip wetting inhibitor 5 and the wraparound portion of the magnetic encoder.

An upper limit value of the gap D2 is set within a range where the lip wetting inhibitor 5 functions as a receiver for the muddy water or the like which has penetrated the atmosphere-side annular cavity portion B from the gap D1.

Then, even if the lip wetting inhibitor 5 is applied with a water pressure and is elastically deformed radially, the tip end of the lip wetting inhibitor 5 does not contact the axially inner surface 2C of the outward flange portion 2B. Thus, the tip end of the lip wetting inhibitor 5 is not brought into sliding contact with the axially inner surface 2C, and accordingly, torque is not increased by the lip wetting inhibitor 5.

An angle α formed by a straight line that extends along a plane including an axial direction as described below and the axial direction, as shown in FIG. 2, is 40° or more to less than 90°. The straight line connects the tip end C1 of the radially outer circumferential surface 5A of the lip wetting inhibitor 5 and an outer circumferential edge C2 of the axially inner surface 2C of the outward flange portion 2B to each other.

That is, if the tip end (for example, the outer circumferential edge C2) of the outward flange portion 2B of the slinger 2 and the radially outer circumferential surface 5A (the tip end C1) of the lip wetting inhibitor 5 has the same height, then such an effect that the lip wetting inhibitor 5 functions as a receiver for the muddy water or the like which has penetrated the atmosphere-side annular cavity portion B from the gap D1 is reduced. Therefore, the angle α is desirably 40° or more, and the angle α is less than 90° in terms of structure.

By setting the angle α to 40° or more, the muddy water or the like, which has penetrated the atmosphere-side annular cavity portion B from the gap D1, becomes difficult to penetrate the gap D2 between the tip end of the lip wetting inhibitor 5 and the axially inner surface 2C of the outward flange portion 2B in the case of receiving the muddy water or the like by the lip wetting inhibitor 5. Accordingly, the effect of reducing the wetting possibility of the axial lip 4B is increased.

<Effect Confirmation by Muddy Water Penetration Test>

Example and Comparative Example

In an example, the rotary seal 1 (see FIGS. 1 and 2) according to the first embodiment of the present invention is used, and in a comparative example, the lip wetting inhibitor 5 is eliminated from the rotary seal 1.

(Test Method)

The rotary seals of the example and the comparative example are attached to automotive wheel bearings (hub bearings). An outer ring that is the radially outer member F to which the core metal 3 is fitted is mounted to a position eccentric from an axial center by 0.1 mm by total indicator reading (TIR).

Automotive wheel bearings attached with the rotary seals according to the example and automotive wheel bearings attached with the rotary seals according to the comparative example are fabricated three by three. Axial centers of the respective bearings are set horizontal, and muddy water at a water temperature of 23° C., to which mud (Kanto loam powder) of 10% by weight is mixed, is put to positions of the axial centers of the respective bearings.

In that state, inner rings which are the radially inner members E are rotated at a rotation speed of 1500 rpm for 70 hours with respect to outer rings. Thereafter, the bearings attached with the rotary seals of the example and the comparative example are observed, and regions which the mud thus penetrated has reached are confirmed.

(Test Result)

The muddy water penetrated each of the automotive wheel bearings attached with the rotary seals of the comparative example.

In contrast, with regard to each of the automotive wheel bearings attached with the rotary seals 1 of the example, the muddy water penetrated a space between the radial lip 4C and the grease lip 4D a little, but never penetrated an inside of each of the bearings.

In second to fifth embodiments, which will be described below, the same reference numerals as those in FIGS. 1 and 2 in the first embodiment denote the same or equivalent components.

Second Embodiment

Figure 3:
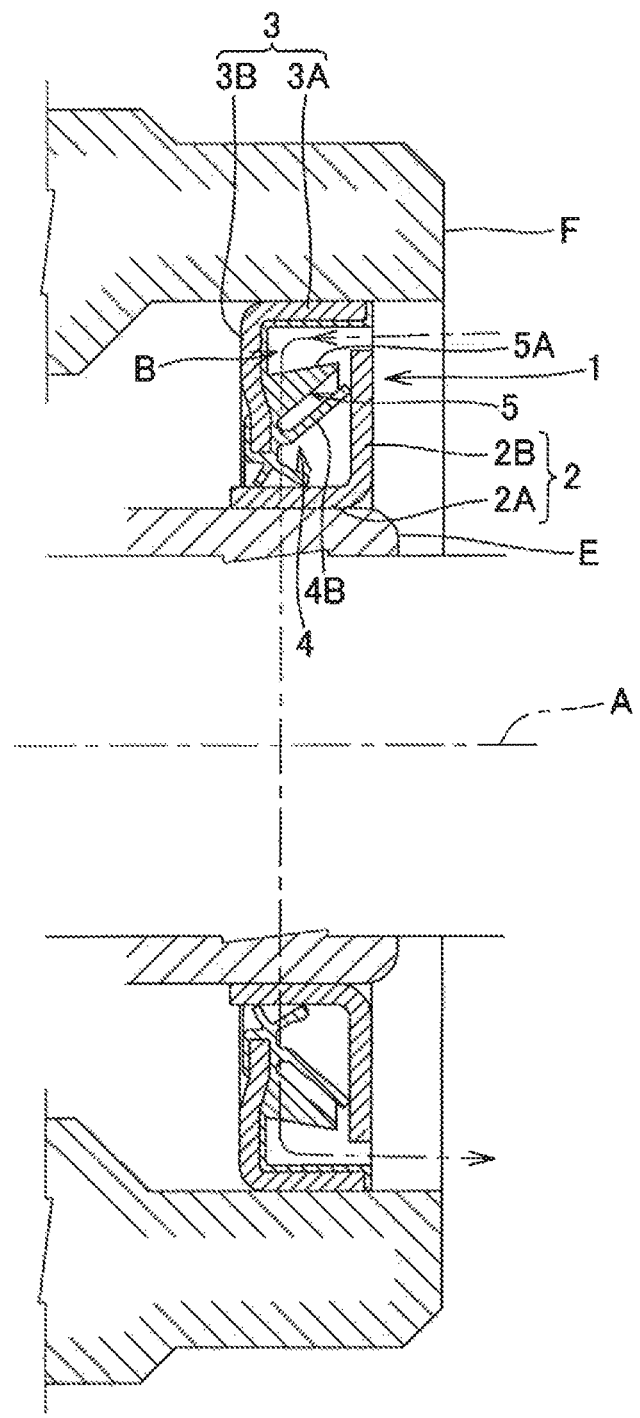
FIG. 3 is an enlarged longitudinal cross-sectional view of a principal portion, showing a state in which a rotary seal according to a second embodiment of the present invention is attached to a radially inward member and a radially outward member.
Figure 4:
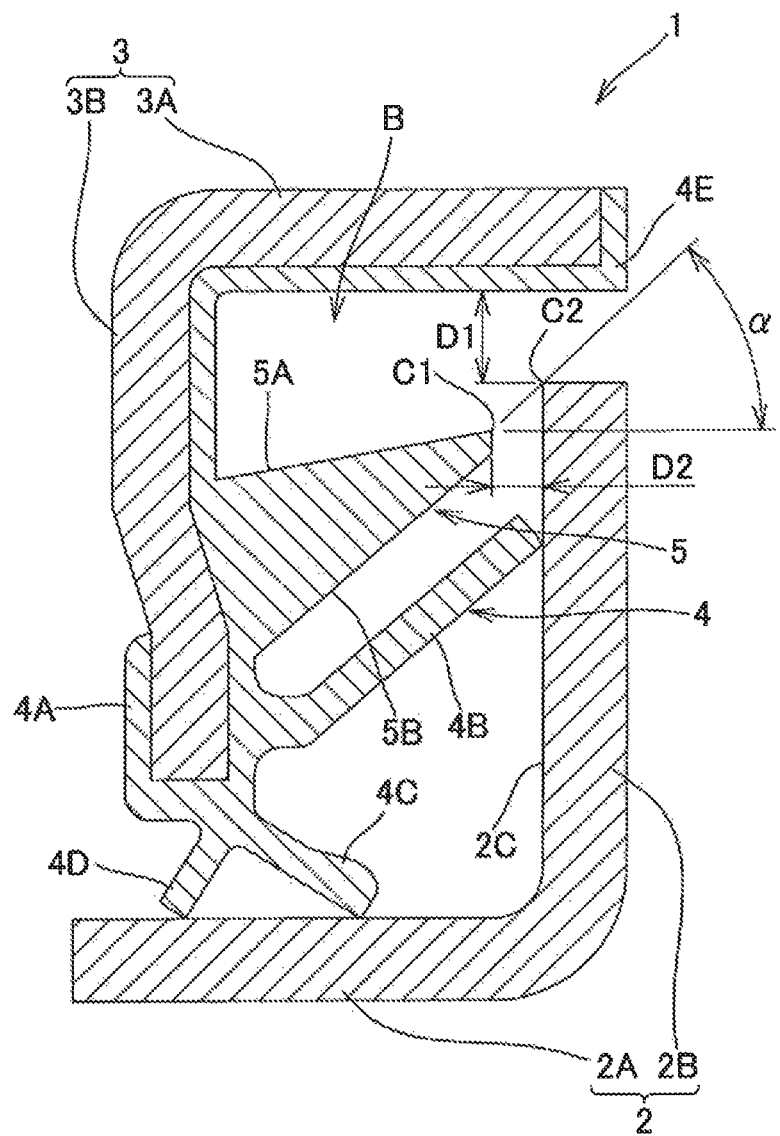
FIG. 4 is an end view of a cut portion taken along a plane including an axial direction of the rotary seal.

As shown in an enlarged longitudinal cross-sectional view of a principal portion in FIG. 3 and an end view of a cut portion in FIG. 4, in a rotary seal 1 according to the second embodiment of the present invention, the radially outer circumferential surface 5A of the lip wetting inhibitor 5 is a partially conical surface expanding in diameter as approaching the outward flange portion 2B of the slinger 2.

In this way, the radially outer circumferential surface 5A of the lip wetting inhibitor 5 is an inclined surface reduced in diameter in a direction of moving away from the outward flange portion 2B of the slinger 2.

Here, since the radially outer circumferential surface 5A of the lip wetting inhibitor 5 is the inclined surface, the muddy water or the like, which penetrates the atmosphere-side annular cavity portion B from the gap D1 located radially outward of the outward flange portion 2B of the slinger 2 and is received by the lip wetting inhibitor 5, is difficult to penetrate the gap D2 between the tip end of the lip wetting inhibitor 5 and the axially inner surface 2C of the outward flange portion 2B. Accordingly, the effect of reducing the wetting possibility of the axial lip 4B is further increased.

Third Embodiment

Figure 5:
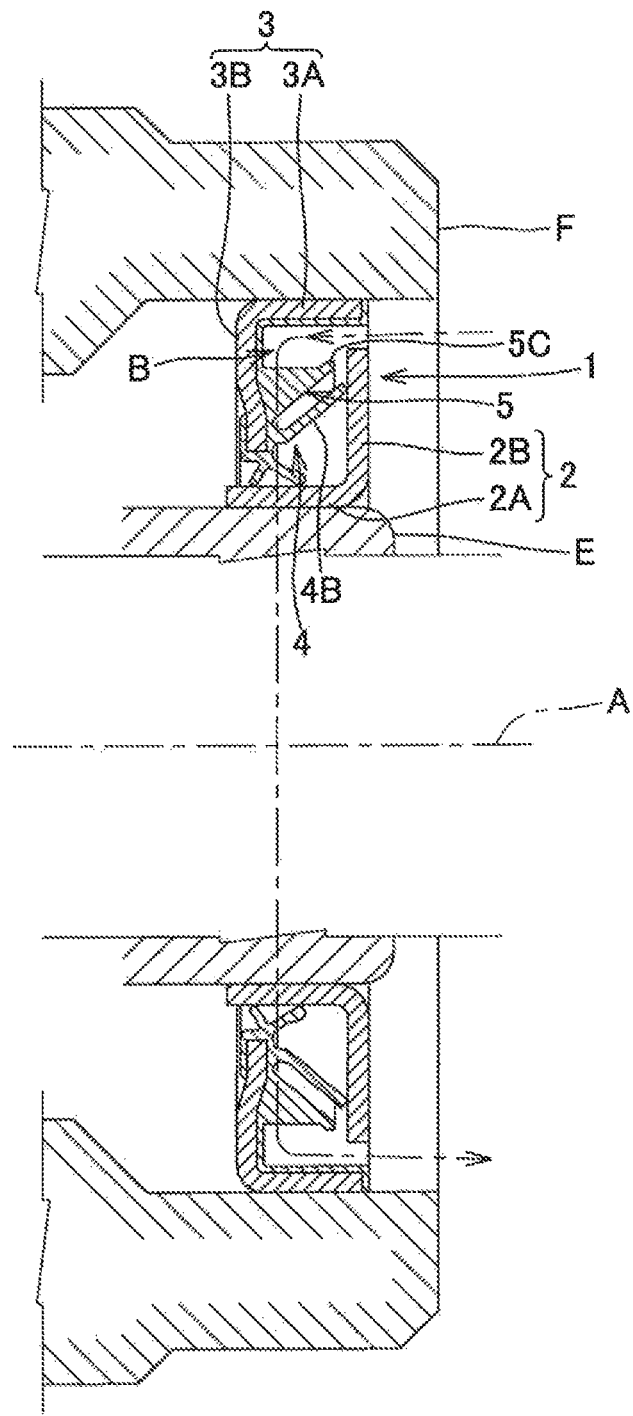
FIG. 5 is an enlarged longitudinal cross-sectional view of a principal portion, showing a state in which a rotary seal according to a third embodiment of the present invention is attached to a radially inward member and a radially outward member.
Figure 6:
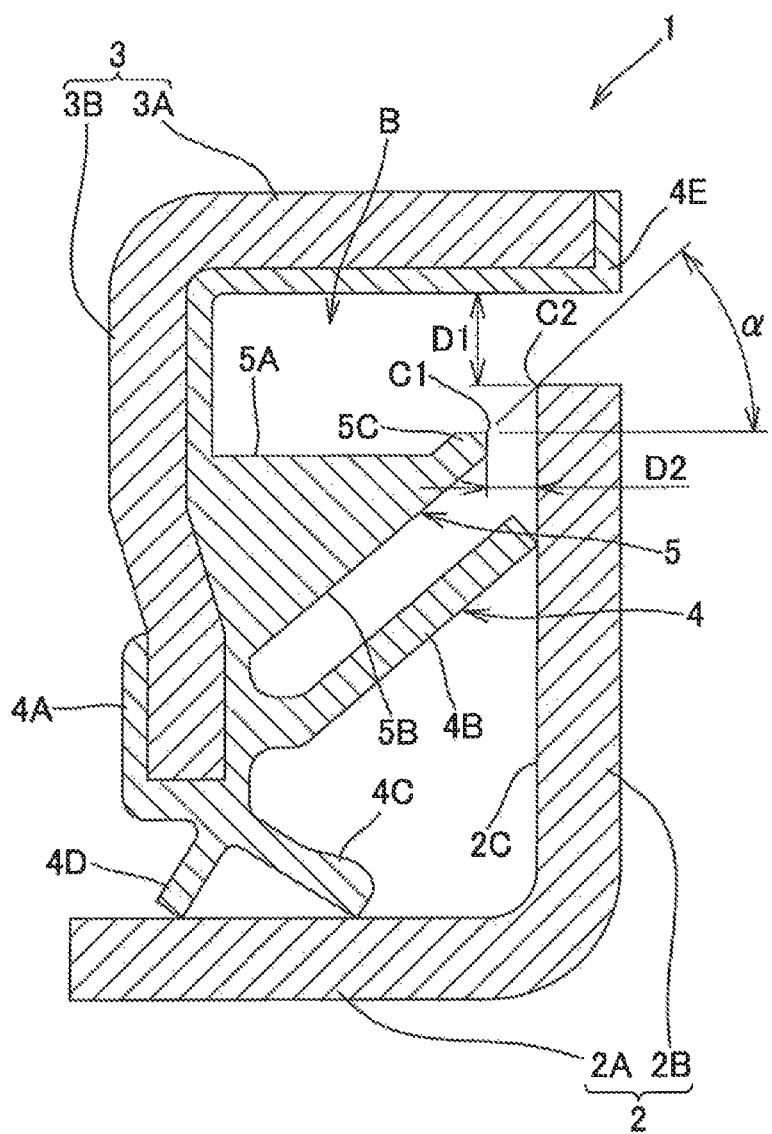
FIG. 6 is an end view of a cut portion taken along a plane including an axial direction of the rotary seal.

As shown in an enlarged longitudinal cross-sectional view of a principal portion in FIG. 5 and an end view of a cut portion in FIG. 6, in a rotary seal 1 according to the third embodiment of the present invention, a brim portion 5C that protrudes radially outward is provided on a tip end portion of the radially outer circumferential surface 5A of the lip wetting inhibitor 5.

Here, the muddy water or the like, which penetrates the atmosphere-side annular cavity portion B from the gap D1 located radially outward of the outward flange portion 2B of the slinger 2 and is received by the lip wetting inhibitor 5, is difficult to penetrate the gap D2 between the tip end of the lip wetting inhibitor 5 and the axially inner surface 2C of the outward flange portion 2B beyond the brim portion 5C that is provided on the tip end portion of the radially outer circumferential surface 5A of the lip wetting inhibitor 5 and protrudes radially outward. Accordingly, the effect of reducing the wetting possibility of the axial lip 4B is further increased.

Note that, in the configuration as in the second embodiment in which the radially outer circumferential surface 5A of the lip wetting inhibitor 5 is the inclined surface reduced in diameter in the direction of moving away from the outward flange portion 2B of the slinger 2, the brim portion 5C that protrudes radially outward may be provided.

Fourth Embodiment

Figure 7:
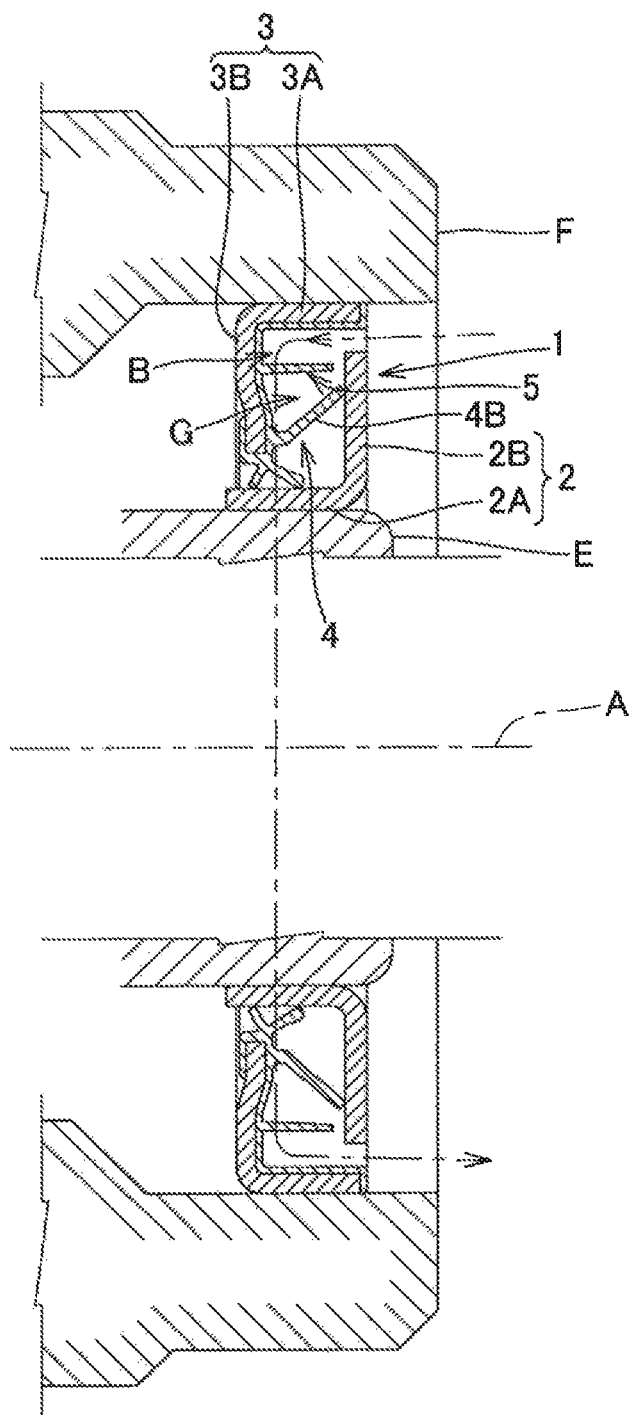
FIG. 7 is an enlarged longitudinal cross-sectional view of a principal portion, showing a state in which a rotary seal according to a fourth embodiment of the present invention is attached to a radially inward member and a radially outward member.
Figure 8:
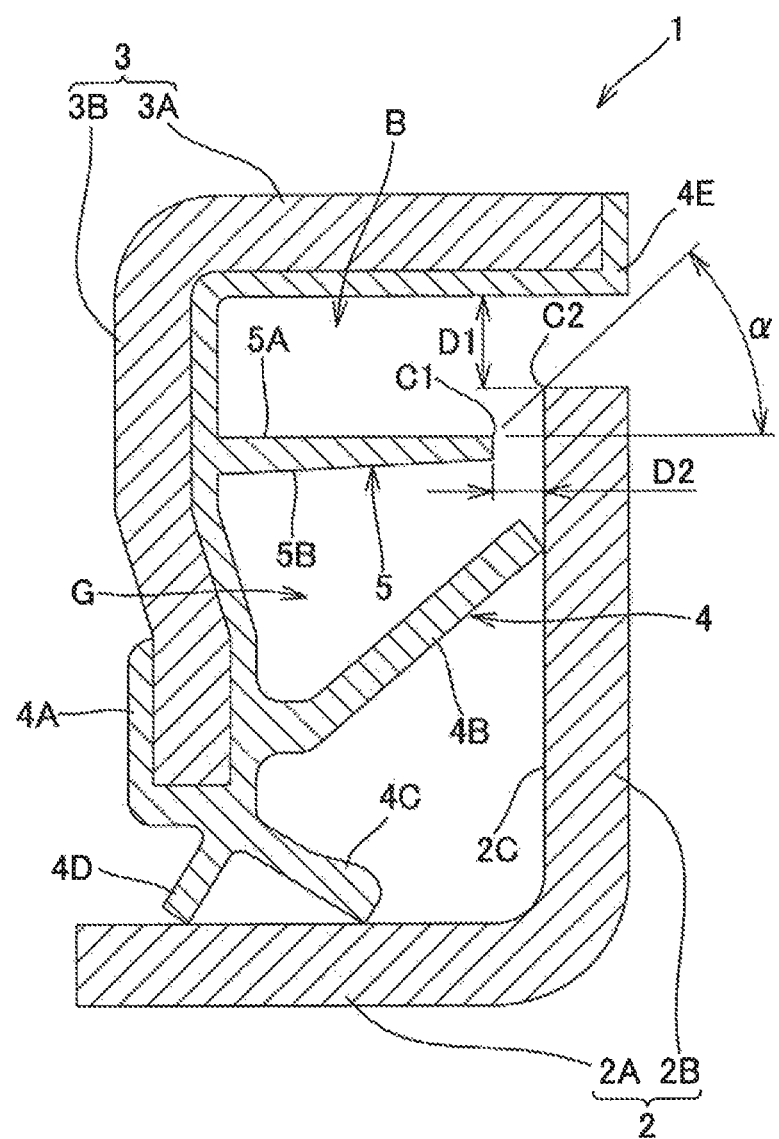
FIG. 8 is an end view of a cut portion taken along a plane including an axial direction of the rotary seal.

As shown in an enlarged longitudinal cross-sectional view of a principal portion in FIG. 7 and an end view of a cut portion in FIG. 8, in a rotary seal 1 according to the fourth embodiment of the present invention, the radially outer circumferential surface 5A of the lip wetting inhibitor 5 is a cylindrical surface similar to that in the first embodiment (FIG. 2). Moreover, the radially inner circumferential surface 5B of the lip wetting inhibitor 5 has a shape extending from a position apart from a base end portion of the axial lip 4B toward the outward flange portion 2B of the slinger 2. That is, the lip wetting inhibitor 5 has a substantially cylindrical shape.

In this way, a space G between the axial lip 4B and the lip wetting inhibitor 5 located radially outward of the axial lip 4B is increased. Therefore, in the case where the muddy water or the like has penetrated the space G from the gap D2 between the tip end of the lip wetting inhibitor 5 and the axially inner surface 2C of the outward flange portion 2B, the muddy water or the like resides in a space on a root side of the axial lip 4B. Accordingly, the muddy water or the like is difficult to reach the tip end of the axial lip 4B.

Hence, even if the muddy water or the like in the space G is dried and is turned to mud that is a solid, such a possibility that the mud may penetrate the sliding contact portion between the axially inner surface 2C of the outward flange portion 2B and the axial lip 4B to result in the deterioration of the followability of the lip is reduced. Accordingly, such an apprehension that the sealing performance may decrease is reduced.

In addition, since the lip wetting inhibitor 5 has a substantially cylindrical shape, the volume of the lip wetting inhibitor 5 is reduced. Accordingly, the manufacturing cost of the rotary seal 1 can be reduced, and the weight of the rotary seal 1 can be reduced.

Fifth Embodiment

Figure 9:
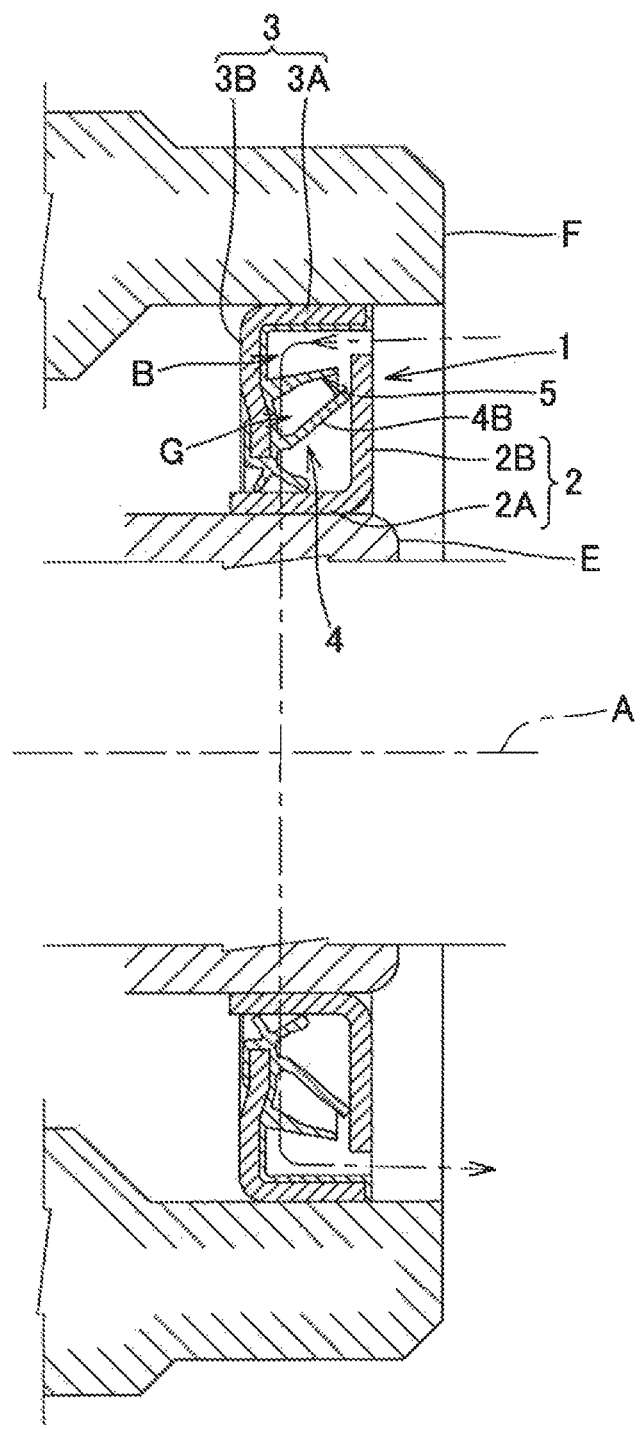
FIG. 9 is an enlarged longitudinal cross-sectional view of a principal portion, showing a state in which a rotary seal according to a fifth embodiment of the present invention is attached to a radially inward member and a radially outward member.
Figure 10:
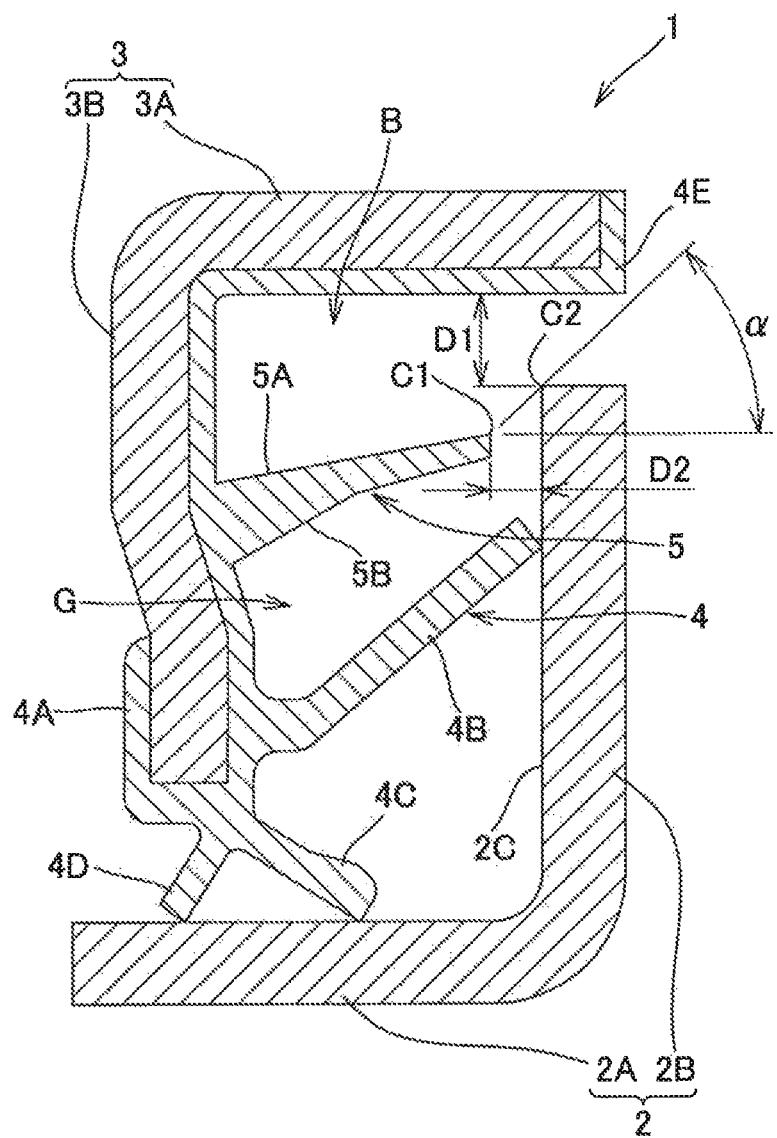
FIG. 10 is an end view of a cut portion taken along a plane including an axial direction of the rotary seal.

As shown in an enlarged longitudinal cross-sectional view of a principal portion in FIG. 9 and an end view of a cut portion in FIG. 10, in a rotary seal 1 according to the fifth embodiment of the present invention, the radially outer circumferential surface 5A of the lip wetting inhibitor 5 is an inclined surface similar to that in the second embodiment (FIG. 4). Moreover, the radially inner circumferential surface 5B of the lip wetting inhibitor 5 has a shape extending from the position apart from the base end portion of the axial lip 4B toward the outward flange portion 2B of the slinger 2. That is, the lip wetting inhibitor 5 has a substantially truncated conical cylindrical shape.

In this way, the fifth embodiment produces the same functions and effects as those in the second embodiment (FIG. 4) and the fourth embodiment (FIG. 8).

The rotary seal 1 of the present invention includes the lip wetting inhibitor 5 radially outward of the axial lip 4B. Accordingly, the direct contact between the axial lip 4B and the muddy water or the like which has penetrated the atmosphere-side annular cavity portion B from the gap D1 located radially outward of the outward flange portion 2B of the slinger 2 can be prevented.

Hence, the gap D1 may be extended to a size at which the gap D1 does not function as the labyrinth seal. In this way, the muddy water or the like, which has penetrated the atmosphere-side annular cavity portion B, is easily discharged from the gap D1 by gravity.

What is claimed is:

1. A rotary seal that includes:
   a slinger including a cylindrical portion and an outward flange portion extending radially outward from an axial end of the cylindrical portion;
   a core metal including a cylindrical portion and an inward flange portion extending radially inward from an axial end of the cylindrical portion; and
   a seal member including a base joined to the core metal, a seal lip including an axial lip that extends from the base and is brought into sliding contact with an axially inner surface of the outward flange portion, and an outer circumferential seal portion that covers a tip end of the cylindrical portion of the core metal;
   the rotary seal being used for a horizontal rotation axis or an inclined rotation axis in a state where the cylindrical portion of the slinger is attached to a radially inner member and the cylindrical portion of the core metal is attached to a radially outer member, the rotary seal comprising
   a lip wetting inhibitor that is located radially outward of the axial lip and protrudes axially from the base or the inward flange portion toward the outward flange portion, wherein a gap is provided between a tip end of the lip wetting inhibitor and the axially inner surface of the outward flange portion, an atmosphere-side annular cavity portion bounded by the lip wetting inhibitor is provided, the atmosphere-side annular cavity portion communicating with a gap between a tip end of the outward flange portion and the outer circumferential seal portion, substantially along an axial direction, and the tip end of the lip wetting inhibitor does not contact the axially inner surface even when the lip wetting inhibitor is applied with a water pressure and elastically deformed.

2. The rotary seal according to claim 1, wherein an angle formed by an axial direction and a straight line that extends along a plane including the axial direction is 40° or more and less than 90°, the straight line connecting a tip end of a radially outer circumferential surface of the lip wetting inhibitor and an outer circumferential edge of the axially inner surface of the outward flange portion to each other.

3. The rotary seal according to claim 2, wherein the radially outer circumferential surface of the lip wetting inhibitor is a partially conical surface expanding in diameter as approaching the outward flange portion.

4. The rotary seal according to claim 2, wherein a brim portion that protrudes radially outward is provided on a tip end portion of the radially outer circumferential surface of the lip wetting inhibitor.

5. The rotary seal according to claim 2, wherein
a radially inner circumferential surface of the lip wetting inhibitor has a shape extending from a position apart from a base end portion of the axial lip toward the outward flange portion, and
the lip wetting inhibitor has a substantially cylindrical shape or a substantially truncated conical cylindrical shape.

* * * * *